(12) United States Patent
Lee et al.

(10) Patent No.: US 7,768,802 B2
(45) Date of Patent: Aug. 3, 2010

(54) SWITCHING MODE POWER SUPPLY AND METHOD OF OPERATION

(75) Inventors: J. Hoon Lee, Bucheon (KR); Hang-Seok Choi, Bucheon (KR); Gwan-Bon Koo, Bucheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 381 days.

(21) Appl. No.: 11/827,196

(22) Filed: Jul. 11, 2007

(65) Prior Publication Data

US 2008/0019161 A1 Jan. 24, 2008

(30) Foreign Application Priority Data

Jul. 19, 2006 (KR) .................. 10-2006-0067427

(51) Int. Cl.
*H02M 3/335* (2006.01)
(52) U.S. Cl. ............... 363/21.16; 363/21.03; 363/21.13
(58) Field of Classification Search .............. 363/21.13, 363/21.03, 80, 21.01, 21.02, 97, 21.16, 21.08, 363/21.12, 21.17–21.18
See application file for complete search history.

(56) References Cited

U.S. PATENT DOCUMENTS

| | | | |
|---|---|---|---|
| 5,430,633 A * | 7/1995 | Smith | 363/20 |
| 6,002,598 A * | 12/1999 | Seinen et al. | 363/49 |
| 6,249,876 B1 | 6/2001 | Balakrishnan et al. | |
| 6,587,361 B2 * | 7/2003 | Preller | 363/97 |
| 2004/0057256 A1 * | 3/2004 | Feldtkeller | 363/21.01 |
| 2005/0243894 A1 * | 11/2005 | Chen et al. | 375/139 |

* cited by examiner

*Primary Examiner*—Monica Lewis
*Assistant Examiner*—Harry Behm
(74) *Attorney, Agent, or Firm*—Sidley Austin LLP

(57) ABSTRACT

In one embodiment, a switching mode power supply (SMPS) includes a rectifier for generating an input DC voltage from an input AC voltage. A switching transistor, coupled to a primary coil of a transformer, converts the input DC voltage and supplies power to a secondary side of the transformer according to an operation of the switching transistor. A switching controller receives a feedback voltage corresponding to a voltage of the secondary side of the transformer, a sense signal corresponding to current flowing at the switching transistor, and a first signal corresponding to a voltage difference between first and second electrodes of the switching transistor. The switching controller controls the turning on and off of the switching transistor. After the switching transistor is turned off, the switching controller detects and counts a number of times that a voltage level of the first signal and a reference voltage are equal. The switching controller causes the switching transistor to turn-on when the count of the number of times reaches a variable reference number.

46 Claims, 5 Drawing Sheets

SWITCHING MODE POWER SUPPLY AND METHOD OF OPERATION

CROSS-REFERENCE TO RELATED APPLICATION

This application claims priority to and the benefit of Korean Patent Application No. 10-2006-0067427 filed in the Korean Intellectual Property Office on Jul. 19, 2006, the entire content of which is incorporated herein by reference.

BACKGROUND OF THE INVENTION (a) Field of the Invention

The present invention relates to a switching mode power supply (SMPS) and, more particularly, to a quasi-resonant SMPS and a method of operation.

(b) Description of the Related Art

In general, a SMPS has at least one switching device (e.g., a transistor) which can be switched or turned on an off to deliver or supply power to a load. A SMPS can rectify an input AC voltage to and input DC voltage (also called a DC-link voltage) and converts the input DC voltage into an output DC voltage having a different level. An SMPS can be used in electronic devices such as mobile phone chargers or lap-top computer adapters.

Electromagnetic interference (EMI) can arise in a SMPS, in part, due to turning on and off a switching device at constant frequency. A device with high EMI generates noise in other devices using the same power source.

A quasi-resonant SMPS is one in which the switching frequency for turning on and off the switching device is modulated within a range in order to reduce EMI. The EMI spectrum for a conventional quasi-resonant SMPS is scattered with the changing switching frequency, responsive to a ripple of the DC-link voltage. This minimizes a power supply's switching losses, while allowing for higher switching frequencies. As the AC input voltage increases in a conventional quasi-resonant SMPS, the DC-link voltage ripple of the SMPS decreases. The decrease in the DC-link voltage ripple may reduce the modulation range of the switching frequency, thus resulting in an increase in EMI. A device with high EMI can cause detrimental effects to other devices using the same power source. Thus, various regulations exist which specify limits to this kind of interference. Generally, in order to meet the regulations, a conventional design for an SMPS includes filters or external components to reduce EMI. Such filters or other external components increase the production costs for the SMPS.

SUMMARY OF THE INVENTION

Embodiments of the present invention provide a switching mode power supply (SMPS) and method of operation which reduce electromagnetic interference (EMI) by changing a switching frequency of a switching transistor regardless of an input AC voltage.

An exemplary embodiment of the present invention provides an SMPS. The SMPS includes a rectifier for generating an input DC voltage from an input AC voltage. A switching transistor, coupled to a primary coil of a transformer, converts the input DC voltage and supplies power to a secondary side of the transformer according to an operation of the switching transistor. A switching controller receives a feedback voltage corresponding to a voltage of the secondary side of the transformer, a sense signal corresponding to current flowing at the switching transistor, and a first signal corresponding to a voltage difference between first and second electrodes of the switching transistor. The switching controller controls the turning on and off of the switching transistor. After the switching transistor is turned off, the switching controller detects and counts a number of times that a voltage level of the first signal and a reference voltage are equal. The switching controller causes the switching transistor to turn-on when the count of the number of times reaches a variable reference number.

The variable reference number includes at least of first or second reference number each having a different value, and the switching controller counts the turn-on number of the switching transistor and changes the variable reference number according to the count result.

The SMPS further includes a switching voltage detection unit for generating a first signal corresponding to a voltage difference between the first and second electrodes. The switching controller compares voltage of the first signal and a reference voltage, and when the number that reference voltage and the voltage of the first signal are the same is equal to the first reference number, the switching controller performs an operation of turning on the switching transistor at least one time after a delay time, and thereafter, the switching controller compares the voltage of the first signal and the reference voltage, and if the number that reference voltage and the voltage of the first signal are the same is equal to the second reference number, the switching controller performs the operation of turning on the switching transistor after the delay time.

Or, when a certain time lapses, the switching controller changes the reference number. The switching controller and the switching transistor are formed as a single pack or as each separate pack.

Another embodiment of the present invention provides an SMPS including a rectifier for generating an input DC voltage from an input AC voltage. A switching transistor, coupled to a primary coil of a transformer, converts the input DC voltage and supplies power to a secondary side of the transformer according to an operation of the switching transistor. A switching controller receives a feedback voltage corresponding to a voltage of the secondary side of the transformer, a sense signal corresponding to current flowing at the switching transistor, and a first signal from a reference voltage and a first voltage corresponding to a voltage difference between first and second electrodes of the switching transistor. The switching controller controls the turning on and off of the switching transistor. After the switching transistor is turned off, the switching controller counts an interval at which the first signal has a first level. The switching controller causes the switching transistor to turn-on when the count reaches a variable reference number.

The variable reference number includes at least first or second reference number each having a different value, and the switching controller counts the turn-on number of the switching transistor and changes the variable reference number according to the count result.

The SMPS further includes a switching voltage detection unit for comparing a first current generated by a difference between the first voltage and a reference voltage with a reference current, and generating the first signal of the first level at an interval during which the first current has a higher value than the reference current. The switching controller counts the interval during which the first signal has the first level, and after the intervals are counted by the number equaling the first reference number, the switching controller performs an operation of turning on the switching transistor at least one time after a delay time from a point of time at which the first signal first changes to have the first level, and thereafter, the switching controller counts the interval during which the first signal has the first level, and after the intervals are counted by the number equaling the second reference number, the switching controller performs the operation of turning on the switching transistor after the delay time from the point of time at which the first signal first changes to have the first level.

Or, when a predetermined time lapses, the reference number is changed.

The switching controller and the switching transistor are formed as a single pack or as each separate pack.

Yet another embodiment of the present invention provides a method for driving a switching mode power supply (SMPS) in which an input AC voltage is rectified to generate an input DC voltage, and the input DC voltage is converted according to an on/off operation of a switching transistor to generate an output DC voltage. The method including: providing a feedback voltage corresponding to the output DC voltage, a sense signal corresponding to current flowing at the switching transistor, and a first signal corresponding to a voltage difference between a first electrode and a second electrode of the switching transistor; sensing and counting a first number when a voltage level of the first signal and a reference voltage are equal after the switching transistor is turned off; determining a turn-on time of the switching transistor when the first number and a variable reference number are equal; and changing the variable reference number.

Still another embodiment of the present invention provides a method for driving a switching mode power supply (SMPS) in which an input AC voltage is rectified to generate an input DC voltage, and the input DC voltage is converted according to an on/off operation of a switching transistor to generate an output DC voltage. The method includes: providing a feedback voltage corresponding to the output DC voltage, a sense signal corresponding to a current flowing at the switching transistor, and a first signal from a reference voltage and a first voltage corresponding to a voltage difference between a first electrode and a second electrode of the switching transistor; sensing and counting a first number when the first signal has a first level after the switching transistor is turned off; determining a turn-on point of time of the switching transistor when the first number and a variable reference number are equal; and changing the variable reference number.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings.

DETAILED DESCRIPTION OF THE EMBODIMENTS

Figure 1:
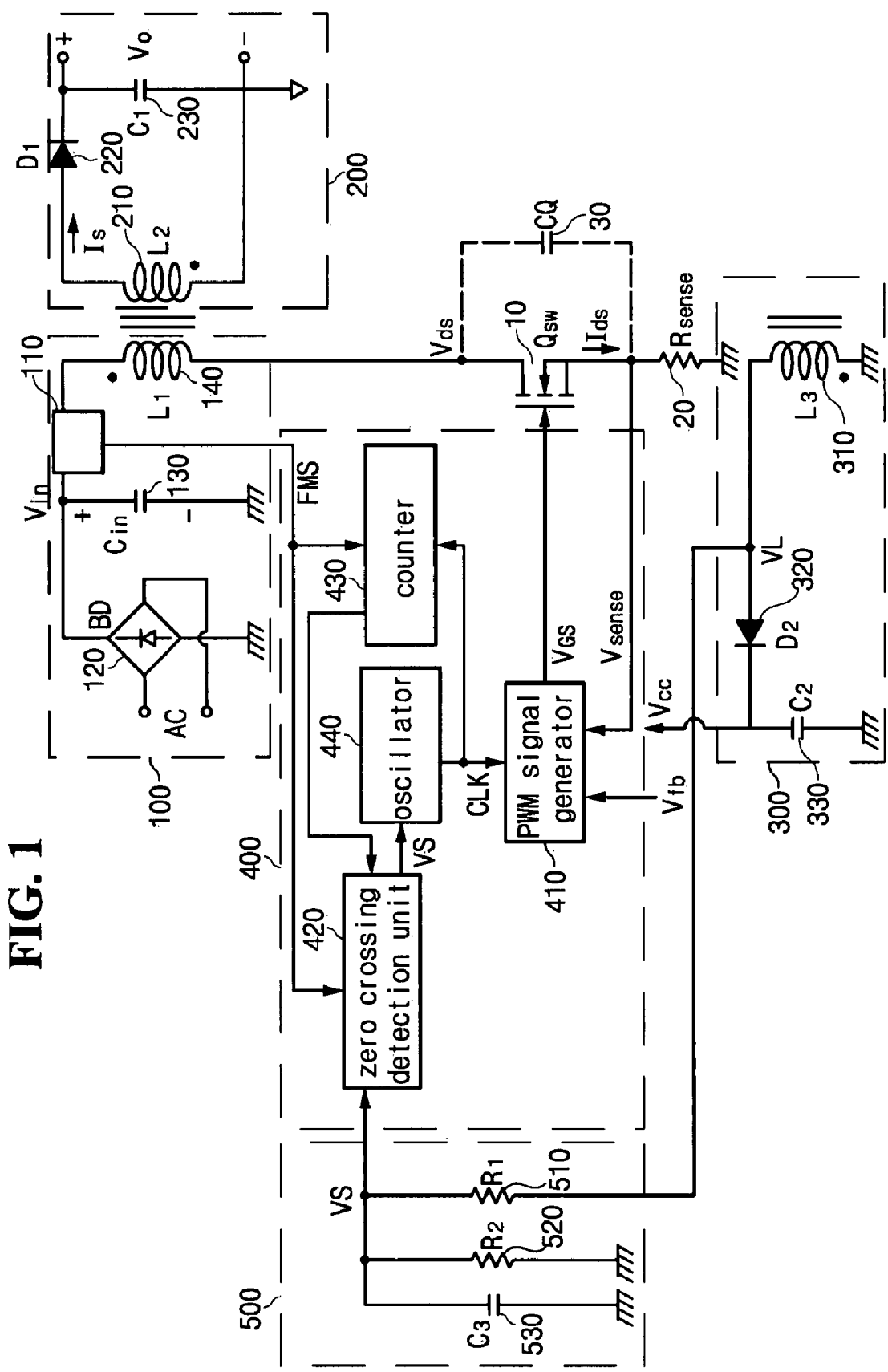
FIG. 1 is a schematic diagram of an exemplary implementation for an SMPS, according to an embodiment of the present invention.

Embodiments of the present invention and their advantages are best understood by referring to FIGS. 1 through 5 of the drawings. In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" or "connected" to another element, the element may be directly coupled or connected to the other element or electrically coupled or connected to the other element through one or more other elements. In addition, unless explicitly described to the contrary, the word "comprise" and variations such as "comprises" or "comprising", will be understood to imply the inclusion of stated elements but not the exclusion of any other elements.

According to some embodiments of the invention, a quasi-resonant SMPS and a driving method thereof sustains a frequency modulation range for a switching transistor of the SMPS regardless of the level of an input AC voltage, thereby reducing EMI.

FIG. 1 is a schematic diagram of an exemplary implementation for an SMPS, according to an embodiment of the present invention. As shown in FIG. 1, the SMPS includes a power supply block 100, an output block 200, a bias voltage supply block 300, a switching controller block 400, and a switch voltage detection block 500.

The power supply block 100 can include a bridge diode (BD) 120 for rectifying an AC input voltage, a capacitor (Cin) 130 for smoothing a rectified voltage, and a primary coil (L1) 140 of a transformer coupled to the capacitor 130. The power supply block 100 converts the AC input voltage into a DC voltage Vin by using the bridge diode 120 and the capacitor 130, and provides power to the secondary side of the transformer, the output block 200, according to a duty cycle of the switching transistor (Qsw) 10.

The power supply block 100 can also include a modulation determining block 110 for determining whether to perform switching frequency modulation in the switching controller block 400. If the DC voltage Vin is less than or equal to a modulation or first reference voltage (Vref1), enough ripple has been generated and the modulation determining block 110 determines that a switching frequency modulation is not necessary in the switching controller block 400. Accordingly, modulation determining block 110 provides a frequency modulation control signal FMS to an input terminal IN5 of the switching controller block 400 to halt or not cause frequency modulation in the switching of transistor 10. Alternatively, if the DC voltage Vin is greater than the modulation reference voltage Vref1, modulation determining block 110 determines that a switching frequency modulation is necessary in the switching controller block 400. The modulation determining block 110 provides a value of the frequency modulation control signal FMS which causes the switching controller block 400 to perform switching frequency modulation, thus reducing EMI. According to an embodiment of the present invention, the modulation reference voltage Vref1 can be set to a voltage corresponding to the highest input DC voltage when the EMI generated by input AC voltage ripple meets the EMI regulation.

The output block 200 can include a secondary coil (L2) 210 of the transformer, a diode (D1) 220 whose anode is coupled to the secondary coil 210 of the transformer, and a capacitor (C1) 230 coupled between a cathode of the diode 220 and ground. Current Is flows from secondary coil 210 through the diode 220 to charge the capacitor 230 at an output terminal of the output block 200. An output voltage Vo is provided to a load at an output terminal.

The bias voltage supply block 300 can include a secondary coil (L3) 310 of the transformer, a diode (D2) 320 whose anode is coupled to the secondary coil L3, and a capacitor (C2) 330 coupled between a cathode of the diode 330 and ground. The switching controller block 400 can be implemented as an Integrated Circuit (IC), and the bias voltage supply block 300 can supply or provide a bias voltage Vcc for operating the IC. That is, when the switching transistor 10 begins switching, the secondary coil 310 and the diode 320 also begin operation, thus charging capacitor 330 to provide Vcc.

A voltage signal VL is generated at one end of secondary coil 310 in bias voltage supply block 300. The secondary coil 310 reflects a both-end voltage of the primary coil 140. The both-end voltage of the primary coil 140 is equal to the voltage obtained by subtracting the DC voltage Vin from the drain-source voltage Vds of the switching transistor 10. Accordingly, the both-end voltage VL of the secondary coil 310 reflects the drain-source voltage Vds of the switching transistor 10.

The switch voltage detection block 500 generates a sync signal VS that corresponds to a drain-source voltage Vds of the switching transistor 10 by using the voltage signal VL of the secondary coil 310. The switch voltage detection block 500 provides sync signal VS to the switching controller block 400. The switch voltage detection block 500 can include resistors (R1) 510 and (R2) 520, and a capacitor (C3) 530. The resistors 510 and 520 are coupled in series between the secondary coil 310 and ground. The capacitor 530 is coupled between a contact of the resistors 510 and 520 and ground. The resistors 510 and 520 and the capacitor 530 serve as an RC filter or a delay circuit, and the voltage of the sync signal VS corresponds to the drain-source voltage Vds of the switching transistor 10.

The switching controller block 400 can include a pulse width modulation (PWM) signal generator 410, a zero crossing detection block 420, a counter 430, and an oscillator 440. The switching controller block 400 receives a feedback signal Vfb, a sense signal Vsense which is an indication of current Ids flowing through the switching transistor 10, and the sync signal VS. The switching controller block 400 outputs a gate control signal VGS for controlling the turning on and off of the switching transistor 10. The feedback signal Vfb is a signal corresponding to the output voltage Vo, and may be used in determining the turn-off of the switching transistor 10. The feedback signal Vfb can be generated using an optocoupler, as understood by those skilled in the art. The PWM signal generator 410 receives a clock signal CLK transmitted from the oscillator 440, the sense signal Vsense, and the feedback signal Vfb. The PWM signal generator 410 outputs the signal VGS for controlling the turning on and off of the switching transistor 10. A detailed description of the operation of the PWM signal generator 410 is described below with reference to FIG. 3. The zero crossing detection block 420, which receives the sync signal VS from the switch voltage detection block 500, detects points at which the sync signal VS has the same value as a second reference voltage Vref2. The zero crossing detection block 420 may count the number of detected points (i.e., times that the sync signal VS is equal to the second reference voltage Vref2). When the number of detected points is equal to a reference number CR, the sync signal VS is delayed for a delay time Td and a corresponding detect signal DS is output to the oscillator 440. According to an exemplary embodiment of the present invention, the reference number CR is controlled by the counter 430. In one embodiment, the delay time Td in the zero crossing detection block 420 can be set by a user, for example, as the time at which a waveform of the sync signal VS crosses the second reference voltage Vref2 and the lowest point (valley) of a resonance waveform. That is, the delay time Td compensates for the difference between the points at which the sync signal VS and the second reference voltage Vref2 cross and the lowest point (valley) of a resonance waveform. The delay time Td can be pre-set according to a resonance waveform of the drain-source voltage Vds of the switching transistor 10. In one embodiment, the delay time Td can be set as a time interval corresponding to one-fourth of the shortest resonance waveform period.

In one embodiment, the zero crossing detection block 420 determines the reference number CR in response to the frequency modulation control signal FMS output from the modulation determining block 110. When the frequency modulation control signal FMS instructs the SMPS to provide frequency modulation, the counter 430 counts the number of times at which the sync signal VS crosses the second reference voltage Vref2, up to the reference number CR. The zero crossing detection block 420 delays the sync signal VS for the delay time Td, and then outputs the detect signal AS to the oscillator 440. When the frequency modulation control signal FMS does not instruct the SMPS to provide frequency modulation, the counter 430 counts the number of times at which the sync signal VS crosses the second reference voltage Vref2, up to the reference number CR. The zero crossing detection block 420 delays the sync signal VS for the delay time Td, and then provides the detect signal DS to the oscillator 440. In one embodiment, for this case, the predetermined reference number CR can be a value previously determined by the user.

When the detect signal DS is detected, the oscillator 440 outputs a high pulse on the clock signal CLK and sends it to the PWM signal generator 410.

The counter 430 determines whether to change the reference number CR according to the frequency modulation control signal FMS. The counter 430 counts the number of clock pulses of the clock signal CLK output from the oscillator 440 (which turns on the switching transistor 10), and sets the reference number according to the count. According to an exemplary embodiment of the present invention, the switching controller block 400 changes the reference number CR of the zero crossing detection block 420 for frequency modulation of the switching transistor 10. The reference number CR can be changed when the switching transistor 10 is turned on or when the clock signal CLK count is reaches a certain number. In addition, the reference number CR can be changed at random. After a certain time elapses, the reference number CR can be changed and the certain time can be determined at random.

A drain of the switching transistor 10 is coupled to the primary coil 140 of the transformer and a sensing resistor (Rsense) 20 is coupled between a source of the switching transistor 10 and ground. A resonance capacitor (CQ) 30 can be coupled between the drain and the source of the switching transistor 10. In another embodiment, if the resonance capacitor 30 is not used, parasitic capacitance between the drain and source of the switching transistor 10 is used for resonance. Throughout the remainder of this description, it is assumed that the resonance capacitor CQ is used. In one embodiment, the switching transistor 10 is an N-channel MOSFET having drain and source electrodes as first and second electrodes, and a gate electrode as a control electrode. An output signal VGS of the PWM signal generator 410 is applied to the gate electrode, and controls the turning on and off of the switching transistor 10.

Figure 2:
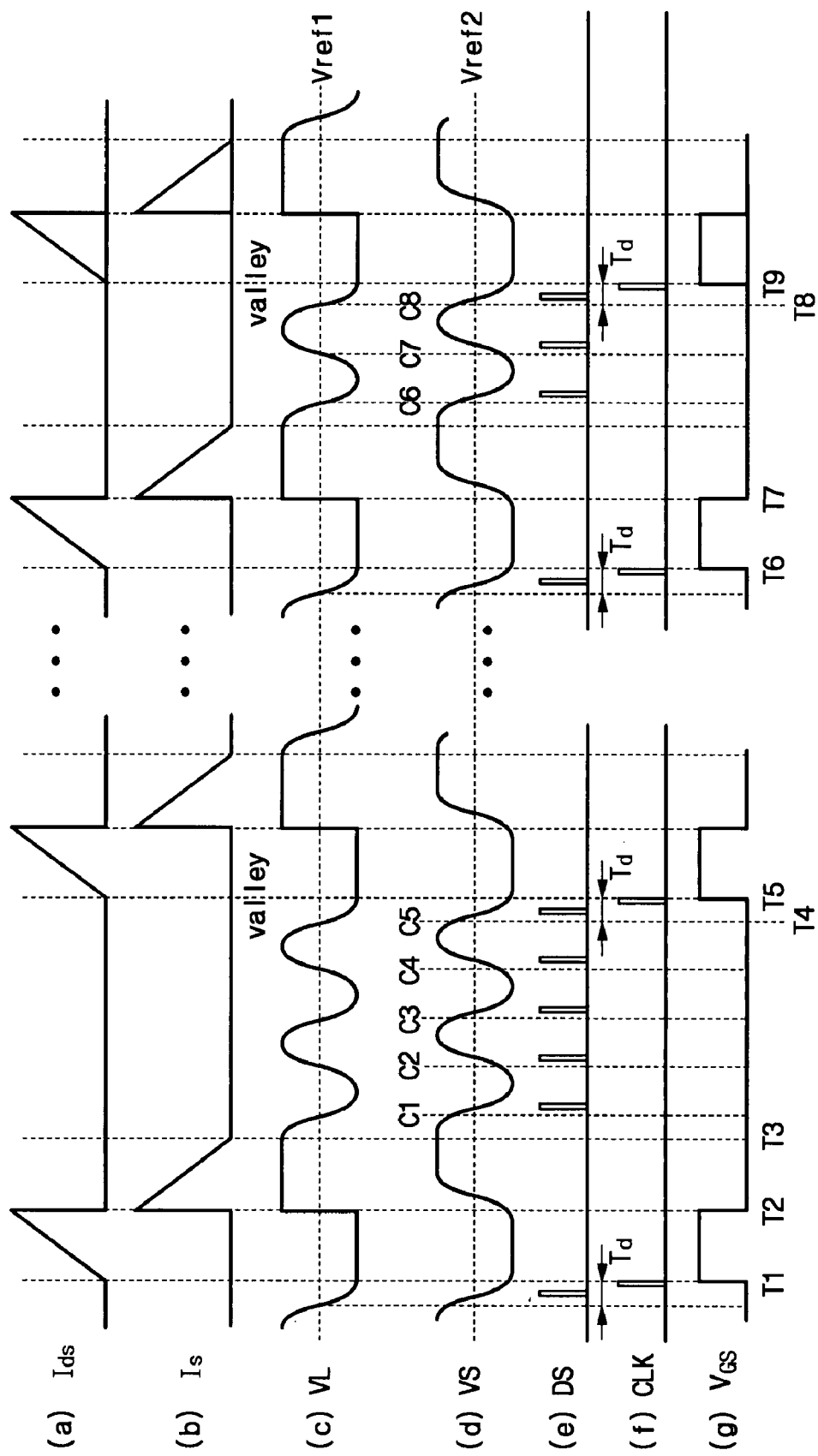
FIG. 2 is a waveform diagram illustrating an exemplary operation for an SMPS, according to an embodiment of the present invention.

FIG. 2 is a waveform illustrating an exemplary operation for an SMPS, according to an embodiment of the present invention. A driving method of the SMPS according to the exemplary embodiment of the present invention will now be described with reference to FIG. 2.

In one embodiment, FIG. 2 illustrates signals generated from each element of the SMPS in FIG. 1. FIG. 2(a) is an exemplary waveform of the current Ids flowing through the switching transistor 10. FIG. 2(b) is an exemplary waveform of the current Is flowing through the diode 220. FIG. 2(c) is an exemplary waveform of the voltage VL corresponding to the drain-source voltage Vds of the switching transistor 10. FIG. 2(d) is an exemplary waveform of the sync signal VS generated by the switch voltage detection block 500. FIG. 2(e) is an exemplary waveform of the detect signal DS. FIG. 2(f) is an exemplary waveform of the clock signal CLK generated by the oscillator 440. FIG. 2(g) is an exemplary waveform of the output signal VGS generated by the PWM signal generator 410.

When the output signal VGS of the PWM signal generator 410 is high at a time T1, the switching transistor 450 is turned on. As illustrated in FIG. 2(a), current Ids flowing through the switching transistor 10 increases with a slope of Vin/L1. The current Ids is converted into the sense signal Vsense by a sensing resistor (Rsense) 20 and provided to the PWM signal generator 410. The PWM signal generator 410 compares the feedback signal Vfb and the sense signal Vsense and changes the VGS signal from high to low. Accordingly, the switching transistor 10 is turned off at a time T2.

As illustrated in FIG. 2(b), current Is flowing through the diode 220 is reduced to zero (with a slope of –Vo/L2) when the switching transistor 10 is turned off at time T2. When the switching transistor 10 is turned off, the drain and source voltage Vds of the switching transistor 10 increases up to a value of Vin+Vo*Np/Ns (where Np and Ns represent the number of turns of the primary side and the secondary side of the transformer, respectively).

At a time T3 when the current Is becomes zero, the diode 220 is turned off and the secondary coil 210 of the transformer is converted into a high impedance state. Accordingly, resonance occurs between the primary coil 140 of the transformer and the resonance capacitor 30, and a resonance period is determined by inductance of the primary coil 140 and capacitance of the resonance capacitor 30. When resonance occurs between the primary coil 140 and the resonance capacitor 30, the signal Vds changes along a cosine curve based on the voltage Vin. As shown in FIG. 2(c), the voltage signal VL corresponding to the drain-source voltage Vds of the switching transistor 10 also changes along a cosine curve based on the first reference voltage Vref1. The voltage signal VL is determined according to the voltage generated at the secondary coil 310, which reflects or corresponds to the drain-source voltage Vds of the switching transistor 10.

The sync signal VS as shown in FIG. 2(d) is generated by the switch voltage detection block 500. That is, the sync signal VS is generated by the resistors 510 and 520 and the capacitor 530. As illustrated in FIG. 2(d), the sync signal VS can increase or decrease somewhat later than the voltage signal VL by an RC time constant. Accordingly, a time at which the signal Vds is minimized and a time at which the sync signal VS is minimized deviate slightly. In other words, the resistors 510 and 520 and the capacitor 530 of the switch voltage detection block 500 serve as a delay circuit for delaying the voltage signal VL and generating the sync signal VS.

As shown in FIG. 2(e), the zero crossing detection block 420 detects times C1-C5 at which the sync signal VS crosses the second reference voltage Vref2. The zero crossing detection block 420 counts the number of times of the crossings and compares it with a reference number K. In one embodiment, as illustrated in FIG. 2, the reference number K can have a value of 5 in one instance, but the present invention is not limited thereto. The zero crossing detection block 420 can generate and count a high level pulse HP at every crossing. After the zero crossing detection block 420 generates the fifth high level pulse HP, it delays for a delay time Td, outputs a high level pulse for detect signal AS, and provides it to the oscillator 440.

Then, as shown in FIG. 2(f), the oscillator 440 outputs a high level pulse for the clock signal CLK at a time T4 and provides it to the PWM signal generator 410.

As shown in FIG. 2(g), the PWM signal generator 410 changes the VGS signal to a high level at a falling timing T5 of the clock signal CLK. Accordingly, the switching transistor 10 is turned on at time T5, the lowest time immediately after the sync signal VS has crossed the second reference voltage Vref2 five times. While the on/off operation of the switching transistor 10 is controlled to be a number equaling the modulation reference number K, the counter 430 counts the number of high level pulses of the clock signal CLK output from the oscillator 440. When the counter 430 counts that the number of high level pulses of the clock signal CLK has reached or is equal to the modulation reference number K, the counter 430 changes the reference number to another value, such as, for example, three. Accordingly, the modulation reference number K can vary at random; it can change within a certain period or when a certain time elapses.

The operation of the SMPS after the reference number K has been changed to three will now be described. After the switching transistor 10 is turned on at a time T6, it is turned off at a time T7. Then, the voltage signal VL is resonated, in like manner as described above.

As shown in FIG. 2(e), the zero crossing detection block 420 detects the times C6-C8 at which the sync signal VS crosses the second reference voltage Vref2. The zero crossing detection block 420 counts the number of crossings and compares it with the reference number K. Because the reference number K is three, the zero crossing detection block 420 generates and counts high level pulses at every crossing. After the third high level pulse is generated, zero crossing detection block 420 delays for the delay time Td, outputs a high level pulse for the detect signal AS, and provides it to the oscillator 440.

As shown in FIG. 2(f), the oscillator 440 then outputs a high level pulse for the clock signal CLK at a time T8 and provides it to the PWM signal generator 410.

As shown in FIG. 2(g), the PWM signal generator 410 changes the VGS signal to high level at a falling timing T9 of the clock signal CLK. Accordingly, the switching transistor 10 is turned on at time T9, the lowest time immediately after the sync signal VS crosses the second reference voltage Vref three times.

While the on/off operation of the switching transistor 10 is controlled by the modulation reference number K, the counter 430 counts the number the number of high level pulses of the clock signal CLK output from the oscillator 440. When the counter 430 counts that the number of high level pulses of the clock signal CLK has reached or is equal to the modulation reference number K, the counter 430 changes the reference number from three to a different value.

Figure 3:
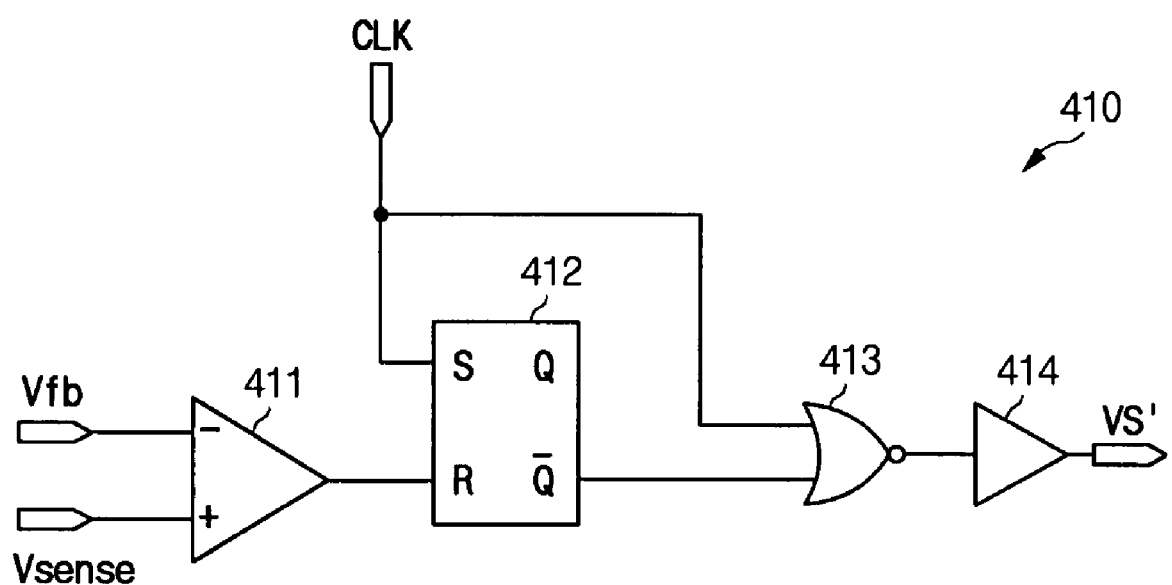
FIG. 3 is a schematic diagram of an exemplary implementation for a PWM signal generator, according to an embodiment of the present invention.

FIG. 3 is a schematic diagram of an exemplary implementation for a PWM signal generator, according to an embodiment of the present invention. As shown in FIG. 3, the PWM signal generator 410 includes a PWM comparator 411, a PWM flip-flop 412, a NOR gate 413, and a gate driver 414.

The PWM comparator 411 compares the feedback signal Vfb with the sense signal Vsense. If the sense signal Vsense is greater than the feedback signal Vfb, the PWM comparator 411 outputs a high signal to a reset terminal (R) of the PWM flip-flop 412. When the high level signal is input to the reset terminal R of the PWM flip-slop 412, a high level signal is output at an inverse output terminal (/Q) of the PWM flip-flop 412 to the NOR gate 413. Then, the NOR gate 413 outputs a low level signal regardless of the level of the clock signal CLK of the oscillator 440, and at this time, the gate driver 414 turns off the switching transistor 10.

As shown in FIG. 2(d), when a high pulse of the clock signal CLK is input to a set terminal (S) of the PWM flip-flop 412, the PWM flip-flop 412 outputs a low level signal at the inverse output terminal (/Q) and provided to the NOR gate 413. In this case, because all of the input signals to the NOR gate 413 are low level at the falling times of the clock signal, namely, at times T1, T5, T6, and T9, the NOR gate 413 outputs a high level signal to the gate driver 414 for each of these times. The gate driver then turns on the switching transistor 10 at times T1, T5, T6, and T9.

In this manner, the SMPS and its driving method, according to the exemplary embodiment of the present invention, counts the number of times when the sync signal VS (corresponding to the drain-source voltage Vds of the switching transistor 10) becomes the second reference voltage, and compares the count with the reference number CK to control the turning on/off the switching transistor 10. The reference number CK is changed at random. Accordingly, the frequency modulation range of the switching transistor 10 is sustained regardless of the level of the input AC voltage. Accordingly, the SMPS and its driving method prevent or avoid the phenomenon of a reduction of the frequency modulation range of switching transistor according to the reduction of the ripple width of the DC-link voltage caused by the increase in the input AC voltage. And thus, EMI can be reduced.

Figure 4:
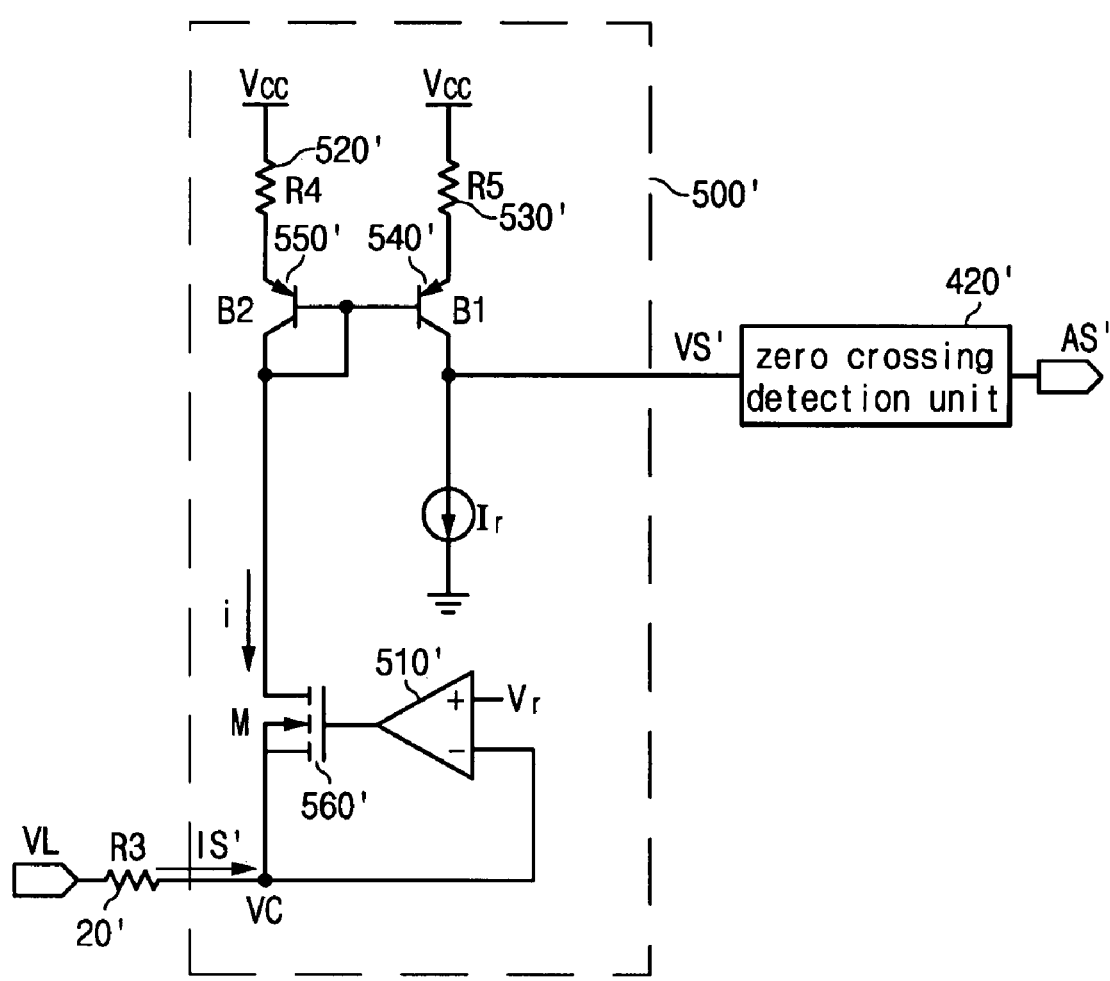
FIG. 4 is a schematic diagram of an exemplary implementation for a switching voltage detection block, according to an embodiment of the present invention.

FIG. 4 is a schematic diagram of an exemplary implementation for a switching voltage detection block 500', according to an embodiment of the present invention. This implementation for a switching voltage detection block, which is an alternative to the one shown and described with reference to FIG. 1, detects a drain-source voltage Vds of the switching transistor 10 using a current-mirror.

The switching voltage detection block 500' includes a reference current source Ir, power source Vcc, resistors (R4) 520' and (R5) 530', a first BJT (B1) 540', a second BJT (B2) 550', a detection transistor (M) 560', and a comparator 510'. The detection transistor 560' is an N-channel MOSFET and includes drain, source, and gate electrodes as first, second, and control electrodes. A resistor (R3) 20' is coupled between the switching voltage detector 500' and the secondary coil 310 to control a current signal Is' generated according to a voltage difference between voltage VC and a voltage signal VL.

A reference voltage Vr is input into a non-inverting terminal (+) of the comparator 510', and the voltage VC is input into an inverting terminal (−) of the comparator 510'. When the voltage VC is greater than the reference voltage Vr, the transistor 560' is turned off. When the voltage VC is less than the reference voltage Vr, the transistor 560' is turned on, which causes the voltage VC to increase. Accordingly, the voltage VC is maintained as the same value as the reference voltage Vr.

When the voltage signal VL is less than the voltage VC, the current i flows through the second BJT 550', and due to the current-mirror, the same amount of current flows through an emitter of the first BJT 540'. If the current i is less than the reference current source Ir, switching voltage detection block 500' outputs a low level value for sync signal VS'. If the current i is greater than the reference current source Ir, switching voltage detection block 500' outputs a high level value for sync signal VS'. When the high level sync signal VS' is output, the value of the voltage signal VL is set as a sensing reference voltage Vref3. Accordingly, the sync signal VS' is high at an interval during which the voltage signal VL is less than the sensing reference voltage Vref3.

The zero crossing detection block 420' counts intervals during which sync signal VS' is high, and compares the number of intervals with a reference number. When the number of intervals reaches or is the same as the reference number, the zero crossing detection block 420' delays for a delay time Td' at which the sync signal VS' changes to a high level is sensed, and then provides a detect signal AS' to the oscillator 440. Upon receiving the detect signal AS', the oscillator 440 outputs a high level pulse for the clock signal CLK and provides it to the PWM signal generator 410.

Figure 5:
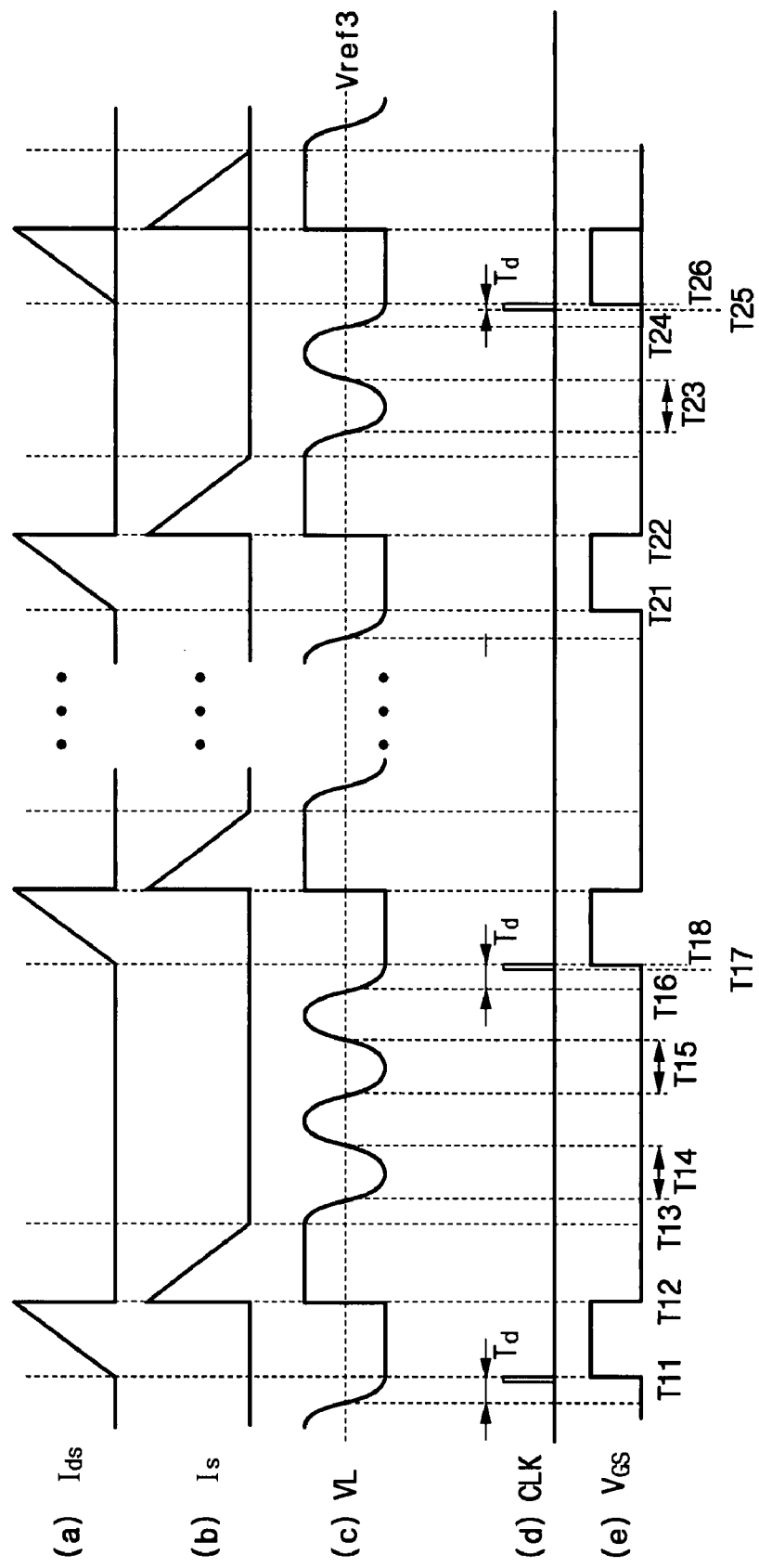
FIG. 5 is a waveform diagram illustrating an exemplary operation for a switching voltage detection block, according to an embodiment of the present invention.

FIG. 5 is a waveform diagram illustrating an exemplary operation for a switching voltage detection block 500', according to an embodiment of the present invention. FIG. 5(a) is an exemplary waveform of the current Ids flowing through the switching transistor 10. FIG. 5(b) is an exemplary waveform of the current Is flowing through the diode 220. FIG. 5(c) is an exemplary waveform of the voltage VL corresponding to the drain-source voltage Vds of the switching transistor 10. FIG. 5(d) is an exemplary waveform of the clock signal CLK generated by the oscillator 440. FIG. 5(e) is an exemplary waveform of the output signal VGS generated by the PWM signal generator 410.

When an output signal VGS of the PWM signal generator 410 becomes high at a time T11, the switching transistor 10 is turned on. As illustrated in FIG. 5(a), the current Ids flowing through the switching transistor 10 increases with a slope of Vin/L1. The current Ids is converted into a sense signal Vsense by the sensing resistor 20 and provided to the PWM signal generator 410. The PWM signal generator 410 then compares a feedback signal Vfb and the sense signal Vsense and changes the VGS signal from high to low at a time T12. Accordingly, the switching transistor 10 is turned off at time T12.

As illustrated in FIG. 5(b), when the switching transistor 10 is turned off at time T12, the current Is flowing through the diode 220 is reduced to zero (with a slope of −Vo/L2).

At a time T13 when the current Is becomes zero, resonance occurs between the primary coil 140 of the transformer and the resonance capacitor 30, and a resonance period is determined by inductance of the primary coil 140 and capacitance of the resonance capacitor 30. When resonance occurs, the signal Vds changes along a cosine curve based on the voltage Vin. As shown in FIG. 5(c), the voltage signal VL corresponding to the drain-source voltage Vds of the switching transistor 10 also changes along a cosine curve based on the first reference voltage Vref1. The voltage signal VL is determined according to voltage generated at the secondary coil 310, which reflects or corresponds to the drain-source voltage Vds of the switching transistor 10.

A high level sync signal VS' is generated during times T14 and T15 by the switch voltage detection block 500'. In one embodiment, a reference number K' is 2. At a time T16, when the number of times that a high sync signal VS' is detected reaches or is equal to the reference number K', the zero crossing detection block 420' generates the detect signal AS' and transfers it to the oscillator 440. Then, the oscillator 440 outputs a high level pulse for the clock signal CLK and provides it to the PWM signal generator 410 at a time T17. FIG. 5 shows the case where the reference number is two times, but the present invention is not limited thereto.

As shown in FIG. 5(e), the PWM signal generator 410 changes the VGS signal to a high level at a falling timing T18 of the clock signal CLK. Accordingly, after the interval during which the high level for the sync signal VS' has been detected twice, the switching transistor 10 is turned on at a time T18, at which the voltage signal VL is at the lowest possible value.

While the on/off operation of the switching transistor 10 is controlled by the modulation reference number K', the counter 430 counts the number of high pulses of the clock signal CLK output from the oscillator 440. When the counter 430 counts that the number of high level pulses of the clock signal CLK has reached or is equal to the modulation reference number K', the counter 430 changes the reference number K' to another value, for example, one. Accordingly, the modulation reference number K' can vary at random; it can change within a certain period or when a certain time elapses.

The operation when the reference number K' has been changed to one will now be described. After the switching transistor 10 is turned on at a time T21, it is turned off at a time T22. Then the voltage signal VL is resonated, in like manner as described above.

The sync signal VS' is high at an interval T23, and the zero crossing detection block 420' generates a detect signal AS' after a delay Td' from a time T24 at which the first sync signal VS' rising starts, and provides it to the oscillator 440. Then the oscillator 440 generates a clock signal CLK with a high level pulse and provides it to the PWM signal generator 410 at a time T25.

As shown in FIG. 5(e), the PWM signal generator 410 changes the VGS signal to high at a falling timing T26 of the clock signal CLK. Accordingly, the switching transistor 10 is turned on at a time T26 at which the voltage signal VL is at its lowest possible value after detecting that the sync signal VS' is high once.

While the on/off operation of the switching transistor 10 is controlled by the modulation reference number K', the counter 430 counts the number of high level pulses from the clock signal CLK output from the oscillator 440. When the counter 430 counts that number of high level pulses has reached or is equal to the modulation reference number K', the counter 430 changes the reference number K' from one to a different value.

In this manner, the SMPS and its driving method, according to the exemplary embodiment of the present invention, counts the intervals during which the voltage signal VL (corresponding to the drain-source voltage Vds of the switching transistor 10) is smaller than the third reference voltage, and compare the count with the reference number K' to control the turning on/off of the switching transistor 10. The reference number K' is changed at random. Accordingly, the frequency modulation range of the switching transistor 10 is sustained regardless of the level of the input AC voltage. Accordingly, the SMPS and its driving method prevent or avoid the phenomenon of a reduction of the frequency modulation range of the switching transistor according to the reduction of the ripple width of the DC-link voltage caused by the increase in the input AC voltage. And thus, EMI can be reduced.

In some embodiments, the switching transistor and the switching controller of the SMPS are provided in a single package; and in other embodiments, the switching transistor and the switching controller are provided in separate packages.

As described above, the SMPS and its driving method, according to embodiments of the present invention, provide a technical advantage in that the switching frequency modulation range can be internally controlled (by sensing the voltage or the current signal) without an external device.

Although the present invention and its advantages have been described in detail, it should be understood that various changes, substitutions, and alterations can be made therein without departing from the spirit and scope of the definition as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A switching mode power supply (SMPS) comprising:
a rectifier for generating an input DC voltage from an input AC voltage;
a switching transistor coupled to a primary coil of a transformer for converting the input DC voltage and supplying power to a secondary side of the transformer according to an operation of the switching transistor; and
a switching controller for receiving a feedback voltage corresponding to a voltage of the secondary side of the transformer, a sense signal corresponding to current flowing at the switching transistor, and a first signal corresponding to a voltage difference between first and second electrodes of the switching transistor obtained by using a voltage of a second coil of the transformer, the switching controller for controlling the turning on and off of the switching transistor,
wherein after the switching transistor is turned off, the switching controller detects and counts a number of times that a voltage level of the first signal and a reference voltage are equal, the switching controller causing the switching transistor to turn-on when the count of the number of times reaches a variable reference number changed at random.

2. The SMPS of claim 1, wherein the variable reference number comprises at least a first reference number and a second reference number, the first reference number of a different value from the second reference number.

3. The SMPS of claim 2, wherein the switching controller counts a number of times that the switching transistor turns on and changes the variable reference number according to the count.

4. The SMPS of claim 2, wherein the reference number is changed when a predetermined time elapses.

5. The SMPS of claim 2, further comprising:
a switching voltage detector for generating the first signal corresponding to the voltage difference between the first and second electrodes.

6. The SMPS of claim 5, wherein:
the switching controller compares a voltage of the first signal and a reference voltage, maintains a first count of the number of times that the voltage of the first signal and the reference voltage are equal, and when the first count reaches the first reference number, the switching controller turns on the switching transistor at least once after a delay time; and
thereafter, the switching controller compares the voltage of the first signal and the reference voltage, maintains a second count of the number of times that the voltage of the first signal and the reference voltage are equal, and when the second count reaches the second reference number, the switching controller turns on the switching transistor after the delay time.

7. The SMPS of claim 6, wherein the switching transistor is turned on when the voltage difference between the first and second electrodes of the switching transistor is the lowest possible voltage value.

8. The SMPS of claim 7, wherein the switching controller comprises:
a zero crossing detection unit for counting the number that the first signal and the reference signal cross each other, comparing the counted number with the variable reference number, and generating a detect signal after the delay time when the counted number is equal to the variable reference number;
an oscillator for generating a clock signal with a pulse of a second level in response to the detect signal; and
a counter for counting pulses of the second level in the clock signal, and changing the variable reference number according to the count.

9. The SMPS of claim 8, wherein the first signal has is phase delayed relative to the voltage difference between the first and second electrodes of the switching transistor, and the delay time compensates for a difference between a time at which the voltage difference between the first and second electrodes of the switching transistor is the lowest possible voltage value and a time at which the first signal and the reference voltage are equal.

10. The SMPS of claim 8, wherein the counter changes the variable reference number when the count is equal to a modulation reference number.

11. The SMPS of claim 10, wherein the modulation reference number is changed for the switching frequency modulation of the switching transistor.

12. The SMPS of claim 1, wherein if the input DC voltage is less than a modulation reference voltage, the switching controller turns on the switching transistor when the voltage difference between the first and second electrodes is the lowest possible voltage level.

13. The SMPS of claim 12, wherein the modulation reference voltage is the highest input DC voltage when a frequency modulation of the switching transistor is generated due to ripple of the input DC voltage and EMI is regulated according to the frequency modulation.

14. The SMPS of claim 1, wherein the switching controller and the switching transistor are contained in single package.

15. The SMPS of claim 1, wherein the switching controller and the switching transistor are contained in separate packages.

16. A switching mode power supply (SMPS) comprising:
a rectifier for generating an input DC voltage from an input AC voltage;
a switching transistor coupled to a primary coil of a transformer for converting the input DC voltage and supplying power to a secondary side of the transformer according to an operation of the switching transistor; and
a switching controller for receiving a feedback voltage corresponding to a voltage of the secondary side of the transformer, a sense signal corresponding to current flowing at the switching transistor, and a first signal from a reference voltage and a first voltage corresponding to a voltage difference between first and second electrodes of the switching transistor obtained by using a voltage of a second coil of the transformer, and the switching controller for controlling the turning on and off of the switching transistor,
wherein after the switching transistor is turned off, the switching controller counts an interval at which the first signal has a first level, the switching controller causing the switching transistor to turn-on when the count reaches a variable reference number changed at random.

17. The SMPS of claim 16, wherein the variable reference number comprises at least a first reference number and a second reference number, the first reference number of a different value from the second reference number.

18. The SMPS of claim 17, wherein the switching controller counts a number of times that the switching transistor turns on and changes the variable reference number according to the count.

19. The SMPS of claim 17, wherein the switching controller changes the reference number when a predetermined time elapses.

20. The SMPS of claim 18, further comprising:
a switching voltage detector for comparing a first current generated by a difference between the first voltage and a reference voltage with a reference current, the switching voltage detector generating the first signal of the first level at an interval during which the first current is greater than the reference current.

21. The SMPS of claim 20, wherein:
the switching controller counts an interval during which the first signal has the first level, maintains a first count for the interval, and when the first count reaches the first reference number, the switching controller turns on the switching transistor at least one time after a delay time at which the first signal first changes to the first level; and
thereafter, the switching controller counts another interval during which the first signal has the first level, maintains a second count for the interval, and when the second count reaches the second reference number, the switching controller turns on the switching transistor after the delay time at which the first signal first changes to the first level.

22. The SMPS of claim 21, wherein the switching transistor is turned on when the voltage difference between the first and second electrodes of the switching transistor is the lowest possible voltage.

23. The SMPS of claim 22, wherein the switching controller comprises:
a zero crossing detection unit for counting an interval during which the first signal is the first level, comparing it with the variable reference number, and generating a detect signal after the delay time at which the first signal first changes from the first level when the counted interval is equal to the variable reference number;

an oscillator for generating a clock signal with a pulse of a second level when the detect signal is inputted; and a counter for counting the number of times that the clock signal is the pulse of the second level, and changing the variable reference number according to the count.

24. The SMPS of claim 23, wherein the delay time compensates for a difference between a time at which the voltage difference between the first and second electrodes of the switching transistor is the lowest possible voltage value and a time at which the first signal is the first level.

25. The SMPS of claim 23, wherein the counter changes the variable reference number when the count is equal to a modulation reference number.

26. The SMPS of claim 25, wherein the modulation reference number is changed for switching frequency modulation of the switching transistor.

27. The SMPS of claim 16, wherein if the input DC voltage is less than a modulation reference voltage, the switching controller turns on the switching transistor when the voltage difference between the first and second electrodes first is the lowest possible voltage value.

28. The SMPS of claim 27, wherein the modulation reference voltage is the highest input DC voltage when a frequency modulation of the switching transistor is generated due to ripple of the input DC voltage and EMI is regulated according to the frequency modulation.

29. The SMPS of one of claim 16, wherein the switching controller and the switching transistor are contained in a single package.

30. The SMPS of one of claim 16, wherein the switching controller and the switching transistor are contained in separate packages.

31. A method for driving a switching mode power supply (SMPS) in which an input AC voltage is rectified to generate an input DC voltage, and the input DC voltage is converted according to an on/off operation of a switching transistor to generate an output DC voltage comprising:

providing a feedback voltage corresponding to the output DC voltage, a sense signal corresponding to current flowing at the switching transistor, and a first signal corresponding to a voltage difference between a first electrode and a second electrode of the switching transistor obtained by using a voltage of a second coil of the transformer;

sensing and counting a first number when a voltage level of the first signal and a reference voltage are equal after the switching transistor is turned off;

determining a turn-on time of the switching transistor when the first number and a variable reference number are equal; and changing the variable reference number at random.

32. The method of claim 31, wherein the variable reference number is changed from a first reference number to a second reference number when the first number is equal to a modulation reference number.

33. The method of claim 32, wherein the first reference number and the second reference number are different values.

34. The method of claim 31, wherein the variable reference number is changed when a predetermined time elapses.

35. The method of claim 31, further comprising:
turning on the switching transistor when the voltage difference between the first and second electrodes of the switching transistor is the lowest possible voltage value.

36. The method of claim 31, wherein the modulation reference number is changed to modulate the switching frequency of the switching transistor.

37. The method of claim 31, further comprising:
turning on the switching transistor when the voltage difference between the first and second electrodes of the switching transistor first has the lowest possible voltage value if the input DC voltage is less than a modulation reference voltage.

38. The method of claim 37, wherein the modulation reference voltage is the highest input DC voltage when a frequency modulation of the switching transistor is generated due to ripple of the input DC voltage and EMI is regulated according to the frequency modulation.

39. A method for driving a switching mode power supply (SMPS) in which an input AC voltage is rectified to generate an input DC voltage, and the input DC voltage is converted according to an on/off operation of a switching transistor to generate an output DC voltage comprising:

providing a feedback voltage corresponding to the output DC voltage, a sense signal corresponding to a current flowing at the switching transistor, and a first signal from a reference voltage and a first voltage corresponding to a voltage difference between a first electrode and a second electrode of the switching transistor obtained by using a voltage of a second coil of the transformer;

sensing and counting a first number when the first signal has a first level after the switching transistor is turned off;

determining a turn-on point of time of the switching transistor when the first number and a variable reference number are equal; and changing the variable reference number at random.

40. The method of claim 39, wherein the variable reference number is changed from a first reference number to a second reference number when the first number is equal to a modulation reference number.

41. The method of claim 40, wherein the first reference number and the second reference number are different values.

42. The method of claim 39, wherein the variable reference number is changed when a predetermined time elapses.

43. The method of one of claim 39, wherein the switching transistor is turned on when the voltage difference between the first and second electrodes of the switching transistor is the lowest possible voltage value.

44. The method of one of claim 39, wherein the modulation reference number is changed to modulate the switching frequency of the switching transistor.

45. The method of one of claim 39, further comprising:
turning on the switching transistor when the voltage difference between the first and second electrodes of the switching transistor first has the lowest possible voltage value if the input DC voltage is less than a modulation reference voltage.

46. The method of claim 45, wherein the modulation reference voltage is the highest input DC voltage when a frequency modulation of the switching transistor is generated due to ripple of the input DC voltage and EMI is regulated according to the frequency modulation.

* * * * *